United States Patent [19]
Huang et al.

[11] Patent Number: 5,231,465
[45] Date of Patent: Jul. 27, 1993

[54] HIGH EFFICIENCY FIBER ABSORBER AND METHOD FOR ATTENUATING PUMP LIGHT IN A BROADBAND FIBER OPTIC LIGHT SOURCE

[75] Inventors: Sidney X. Y. Huang, West Hills; Edward Phillips, Woodland Hills, both of Calif.

[73] Assignee: Litton Systems, Inc., Beverly Hills, Calif.

[21] Appl. No.: 652,534

[22] Filed: Feb. 8, 1991

[51] Int. Cl.[5] ............................................. G01C 19/72
[52] U.S. Cl. ........................................ 356/350; 372/6
[58] Field of Search ...................... 356/350; 372/6, 39, 372/1; 385/127

[56] References Cited

U.S. PATENT DOCUMENTS

| | | | |
|---|---|---|---|
| 4,386,822 | 7/1983 | Bergh | 350/96.15 |
| 4,493,528 | 1/1985 | Shaw et al. | 350/96.15 |
| 4,637,025 | 1/1987 | Snitzer et al. | 372/6 |
| 4,676,583 | 6/1987 | Hicks, Jr. | 372/6 |
| 4,695,123 | 9/1987 | Chang et al. | 350/96.15 |
| 4,725,113 | 2/1988 | Chang et al. | 350/96.15 |
| 4,829,529 | 5/1989 | Kafka | 385/127 |
| 4,860,294 | 8/1989 | Winzer et al. | 372/7 |
| 4,874,216 | 10/1989 | Utaka et al. | 350/96.19 |
| 4,922,496 | 5/1990 | Po | 372/6 |
| 4,935,930 | 6/1990 | Handa | 372/7 |
| 4,946,245 | 8/1990 | Chamberlin et al. | 350/96.19 |
| 4,952,059 | 8/1990 | Desurvire et al. | 356/350 |
| 4,959,837 | 9/1990 | Fevrier et al. | 372/6 |
| 4,963,177 | 10/1990 | Najafi et al. | 65/30.13 |
| 5,016,967 | 5/1991 | Meltz et al. | 350/96.19 |
| 5,108,183 | 4/1992 | Fling et al. | 356/350 |

FOREIGN PATENT DOCUMENTS 0119977 3/1984 European Pat. Off. .
0294037 5/1988 European Pat. Off. .

OTHER PUBLICATIONS

Barnes et al., "Diode-Laser-Pumped Er3+/Yb3+-Doped Fiber Laser Operating at 1.57 um," Technical Digest, Conference on Optic Fiber Communication (1989, Houston), paper TUG4.
Bergh et al., "Single-Mode Fibre Optic Directional Coupler," Electronics Letters, vol. 16, No. 7, Mar. 27, 1980, pp. 260-261.
Eichen et al., "Active Fiber, Optical Attenuators," Proceedings of 16th ECOC '90, Amsterdam, Netherlands, 1990, vol. 1, pp. 567-570.
Wilkinson, et al., "Application of Rare-earth Doped Fibres as Lowpass Filters in Passive Optical Networks," Eletronics Letters, vol. 27, Jan. 31, 1991.

*Primary Examiner*—Samuel A. Turner
*Attorney, Agent, or Firm*—Lynn & Lynn

[57] ABSTRACT

A length of an absorbing optical fiber is connected to receive light output from an optically pumped light source. The light source includes a gain fiber that is doped with erbium. Pumping the erbium with a pump wavelength of 980 nm causes the erbium to emit light having a wavelength of 1550 nm. Ytterbium ions in the absorbing fiber attenuate light having the pump wavelength without affecting the intensity of the 1550 nm light output from the erbium in the gain fiber.

6 Claims, 3 Drawing Sheets

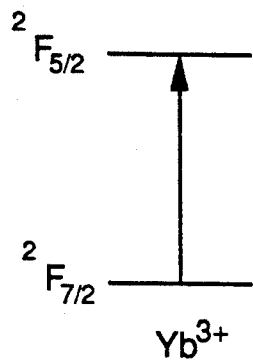
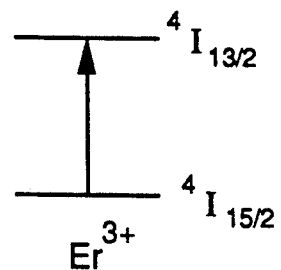
FIG. 2    FIG. 3
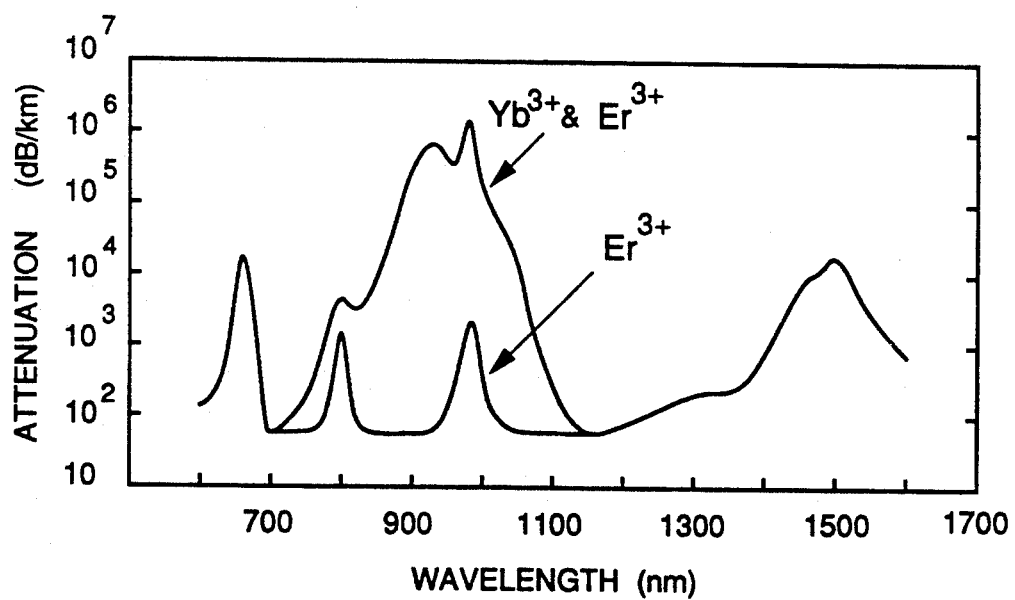
FIG. 4

HIGH EFFICIENCY FIBER ABSORBER AND METHOD FOR ATTENUATING PUMP LIGHT IN A BROADBAND FIBER OPTIC LIGHT SOURCE

BACKGROUND OF THE INVENTION

This invention relates generally to optical fibers and particularly to optical fibers used in forming fiber optic rotation sensors. Still more particularly, this invention relates to an optical fiber that absorbs residual pump light introduced into a fiber optic rotation sensor from an optically pumped broadband fiber light source.

A fiber optic ring interferometer typically comprises a loop of fiber optic material that guides counter-propagating light waves. The light waves typically originate in a solid state optical source such as a superluminescent diode. Rotation of the loop creates a relative phase difference between the counter-propagating waves by the well known Sagnac effect. The amount of phase difference is a function of the angular velocity of the loop. After traversing the loop, the counter-propagating waves are combined so that they constructively or destructively interfere to form an optical output signal.

The optical output signal produced by the interference of the counter-propagating waves varies in intensity as a function of the rotation rate of the loop. Rotation sensing is accomplished by detecting the optical output signal and processing it to determine the rotation rate.

Superluminescent diodes provide coherent light having the desired broad bandwidth. However, superluminescent diodes are expensive and have operating lifetimes that are too short for use in many navigation systems. A triaxial gyro for measuring rotations about three mutually perpendicular axes as required for navigation may be formed using three SLD light sources. A triaxial gyro may also be formed with a plurality of optical couplers arranged to divide the light output from a single SLD source to provide three separate beams. Both of these approaches for providing suitable light beams for a triaxial gyro are expensive and do not solve the short lifetime problem associated with SLDs.

A laser diode pumped rare earth doped fiber source produces light having the desired broad bandwidth, long operating lifetime and wavelength stability. Part of the pump light is absorbed by the gain medium and part may be reflected. However, the optical output an optically pumped source typically includes some of the pump light. The pump light that is in the output is known as residual pump light (RPL). About 10% to 30% of the pump power is output as (RPL) from a broadband fiber source.

RPL degrades the performance of a fiber optic rotation sensor by increasing the noise and instability. No simple solution has been found in literature to prevent the RPL from being introduced into a fiber optic rotation sensor from an optically pumped source.

SUMMARY OF THE INVENTION

This invention uses Ytterbium doped silica fiber as a simple, low cost and high efficient absorber which can be spliced directly with low loss to the output end of Erbium doped fiber of BFS, or inserted into the input port of FOG.

Yb ion has an unique nature that there is only one excited energy level in spectrum. The single strong absorption band from the $^2F_{7/2}$ state to the $^2F_{5/2}$ of a Yb-doped fiber is centered on 950 nm. This absorption band provides an ideal absorption band to eliminate almost completely the RPL at semiconductor pumping wavelengths of $\lambda = 800$ nm to 850 nm and $\lambda = 980$ nm. A Yb-doped fiber is transparent at wavelength of 1550 nm and therefore has no effect on the output of the light source.

A residual pump light absorber according to the present invention for attenuating the pump light in the output of an optically pumped light source comprises a length of optical fiber connected to receive the light output from the optically pumped light source and means disposed within the optical fiber that interacts with the pump light to attenuate the pump light intensity. The light source preferably is pumped with a light source that emits a pump light wavelength of 980 nm and the optical fiber preferably includes Ytterbium ions that absorb the 980 pump light wavelength.

The light source preferably includes a gain fiber that is doped with erbium, which interacts with the pump light to produce super fluorescence having a wavelength of about 1550 nm. The ytterbium preferably has a concentration in the optical fiber in the range of at least 5000 parts per million.

BRIEF DESCRIPTION OF THE DRAWINGS

FIG. 2 illustrates an energy level transition for the $Yb^{3+}$ ion;

FIG. 3 illustrates an energy level transition for the $Er^{3+}$ ion; and

FIG. 4 illustrates the attenuation spectrum of a co-doped optical fiber.

DESCRIPTION OF THE PREFERRED EMBODIMENT

Figure 1:
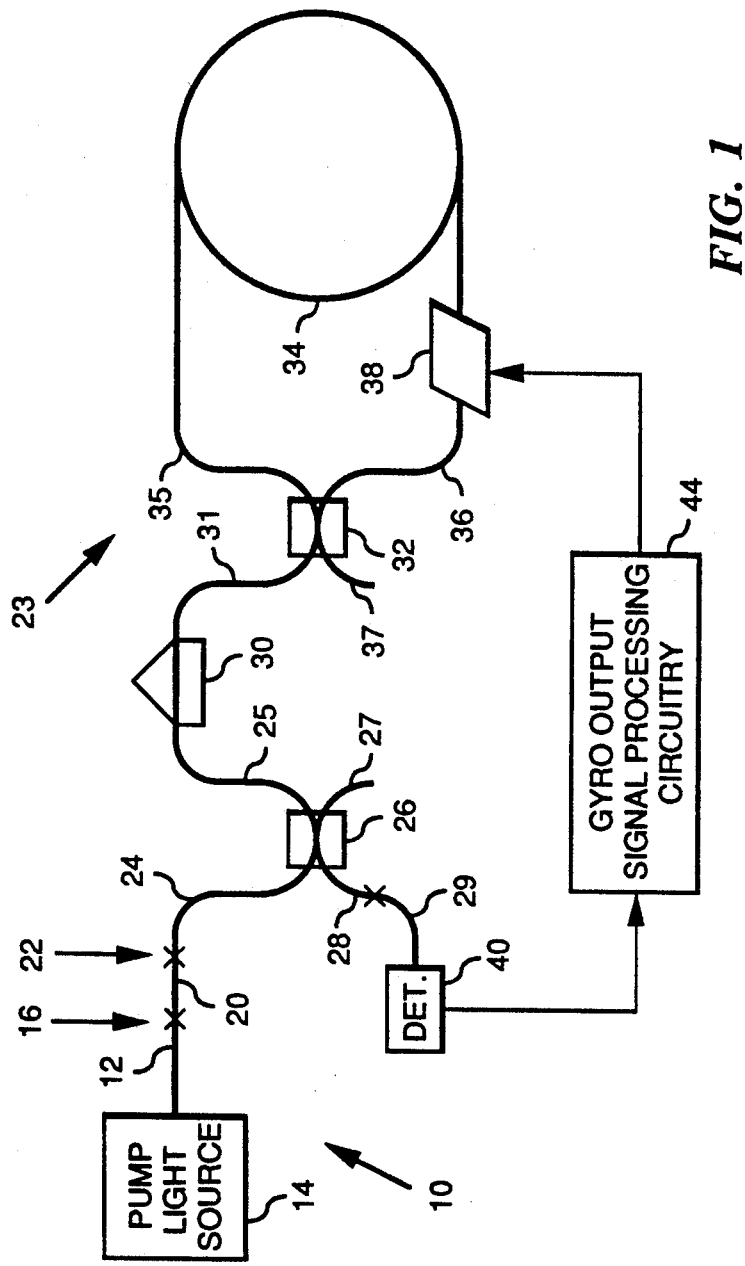
FIGS. 1, 5 illustrate a length of optical fiber formed according to the present invention in a fiber optic rotation sensor.

Referring to FIG. 1, an optically pumped light source 10 is formed to include a length of an optical fiber 12 that is preferably doped with erbium (Er). The optical fiber 12 is subsequently referred to as the gain fiber 12. A pump light source 14, which is preferably a high power laser diode, provides pump light to the erbium doped gain fiber 12. The pump light preferably has a wavelength of 980 nm.

The erbium ions in the gain fiber 12 absorb part of the 980 nm pump light and have a population inversion. $Er^{3+}$ ions experience a transition from the $^4I_{13/2}$ state to the $^4I_{15/2}$ state. The $Er^{3+}$ ions in the $^4I_{15/2}$ state then emit super fluorescent light having a wavelength of 1550 nm. The portion of the 1550 nm light emitted from the erbium that is guided to the right as viewed in FIG. 1 is the desired output of the optically pumped light source 10.

The gain fiber 12 terminates at a splice 16. The $Er^{3+}$ ions absorb about 90% of the incident pump light and undergo a transition from the $^4I_{15/2}$ state to the $^4I_{13/2}$ state. FIG. 4 shows that $Er^{3+}$ ions have an absorption peak at about 980 nm. As seen in FIG. 3, $Er^{3+}$ ions in the gain fiber 12 have an attenuation of slightly less than $10^4$ dB/km. About 10% of the pump light propagates through the gain fiber 12. The optical output of the gain fiber 12 thus includes some of the pump light in addition to the 1550 nm light emitted by the erbium.

If the light source 10 is used to provide the counter-propagating waves in a fiber optic rotation sensor, then the pump light in the output is undesirable. Referring to FIG. 1, an optical fiber 20 that absorbs the pump light while passing the 1550 nm signal is connected to the gain fiber 12 at the splice 16. If the pump light source wavelength is not 980 nm as provided above, then a material other than ytterbium should be used to absorb the pump light.

It has been found that a silica fiber doped with ytterbium (Yb) absorbs the pump wavelength without absorbing the signal wavelength. FIG. 3 illustrates a energy level changes in Yb due to absorption of 980 nm light. The $Yb^{3+}$ ion has a transition from the $^2F_{7/2}$ energy level to the $^2F_{5/2}$ energy level while absorbing the pump light. Typical absorption coefficients $\alpha$ for silica fiber doped with Yb at a concentration of 15000 ppm are:

$$\alpha(\lambda \approx 830 \text{ nm}) \approx 30 \text{ to } 50 \text{ db/m}$$

$$\alpha(\lambda \approx 980 \text{ nm}) \approx 2000 \text{ db/m}$$

$$\alpha(\lambda \approx 1550 \text{ nm}) \approx 0 \text{ db/m}$$

From the above data and FIG. 4 it may be seen that the Yb strongly attenuates the 980 nm pump light without attenuating the 1550 nm signal output from the gain fiber 12. The Yb may emit light having a wavelength of 1040 nm after absorbing the pump light. The amount of power emitted at the 1040 nm wavelength is very low and is typically $\leq 1$ $\mu$W. The 1040 wavelength light is phase randomized as it is spontaneously emitted, and no appreciable influence is expected the operation of a fiber optic rotation sensor. This spontaneously emitted radiation is reabsorbed and eventually diminished in a longer Yb-doped fiber.

To make the device highly efficient and compact, the fiber 20 may be doped with a high concentration of Ytterbium, e.g. 15,000 ppm to 30,000 ppm. With these concentrations of Yb, the fiber 20 may be about 0.5 to 1.0 m long to absorb the 980 nm pump light.

FIG. 1 illustrates an exemplary structure for the fiber optic rotation sensor 23 that includes the light source 10 and the absorbing fiber 20. The fiber 20 terminates at a splice 22 where it is connected to a coupler pigtail fiber 24. The fiber 24 guides the 1550 nm light toward a fiber optic rotation sensor 23. The optical fiber 24 preferably is configured to guide a single mode of electromagnetic radiation. Light input to the optical fiber 24 propagates to a multiplexer optical coupler 26, which is preferably an evanescent field optical coupler. The multiplexer coupler 26 divides the light incident thereon between a pair of coupler pigtail fibers 25 and 27.

A fiber optic directional coupler suitable for use in single mode fiber implementations of the invention is described in the Mar. 28, 1980 issue of *Electronics Letters*, Vol. 18, No. 18, pp. 260-261 and in U.S. Pat. No. 4,493,518, which issued Jan. 15, 1985 to Shaw et al. That patent is assigned to the Board of Trustees of the Leland Stanford Junior University and is hereby incorporated by reference into this present disclosure.

The pigtail fiber 25 then guides the optical signal to a polarizer 30. The polarizer 30 shown in FIG. 1 may be essentially identical to the polarizer disclosed in U.S. Pat. No. 4,385,822 to Bergh, the disclosure of which is incorporated by reference into the present disclosure. Other polarizers that may be used in present invention are disclosed in U.S. Pat. No. 4,725,113 and U.S. Pat. No. 4,695,123, the disclosures of which are incorporated by reference into the present disclosure.

After exiting the polarizer 30, the signal input then passes through a coupler pigtail fiber 31, which guides the signal to a second fiber optic coupler 32. The coupler 32 may be formed to be substantially identical to the multiplexer coupler 26. The coupler 32 divides light input thereto originating from the source 22 between a pair of coupler pigtail fibers 35 and 36, which are preferably also single mode optical fibers.

An optical fiber 34 has its ends connected to the coupler pigtail fibers 35 and 36. A Sagnac sensing coil 34A is formed in the optical fiber 34. A phase modulator 38 is placed between the optical fiber 36 and the coil 34A.

Light from the coupler 32 that enters the optical fiber 35 propagates through the sensing coil 34 before reaching the phase modulator 38. Light from the coupler 32 that enters the optical fiber 36 propagates through the phase modulator 38 before propagating through the sensing coil 34.

The phase modulator 38 receives a drive signal that provides periodic modulation of the phase of the counter propagating light waves in the sensing loop 34 in accordance with a periodic function having a frequency equal to $$f_s = \frac{1}{2\tau}$$

where $\tau$ is the transit time for an optical wave in the sensing loop. The invention will also function properly with a phase modulation frequency of $$f_s = \frac{(2n + 1)}{2\tau}$$

where n is an integer. Modulating the light at these frequencies provides most efficient operation of the phase modulator 38 by requiring the lowest voltage, current, power and electric or magnetic field. These frequencies also provide suppression of Rayleigh backscattering induced noise by modulating this noise outside the detection bandwidth. These frequencies also provide elimination of parasitic polarization modulation caused by the phase modulator 34 and certain nonlinearities in the phase modulation.

As viewed in FIG. 1, the light that enters the optical fiber 35 from the coupler 32 forms the clockwise wave in the sensing coil 34. Light that the coupler 32 diverts into the optical fiber 36 forms the counterclockwise wave in the sensing coil 34. After passing through the phase modulator 38, the clockwise wave propagates through the optical fiber 36 before returning to the coupler 32. The counterclockwise wave traverses the optical fiber 36, the phase modulator 38, the sensing coil 34 and the optical fiber 35 before reaching the optical coupler 32 again.

While traversing the sensing coil 34, the clockwise and counterclockwise waves acquire a phase difference that depends upon the rate of rotation of the sensing coil 34 about its sensing axis. As viewed in FIG. 1, the sensing axis of the sensing coil 34 is perpendicular to the plane defined by the coil and through the center of the coil.

The clockwise and counterclockwise waves combine in the coupler 32. Part of the combined waves exits the coupler 32 via the fiber 31. A second part of the combined waves exits the coupler 32 via the fiber 37. The combined waves form an interference pattern. This interference pattern contains the information that is processed to determine the rotation rate of the sensing coil 34.

The combined waves then propagate back through the optical fiber 31 to the polarizer 30. The polarizer 30 insures that the optical signal processed to determine the rotation rate has the same polarization as the light that was input to the sensing coil 34. These polarizations should be identical to minimize bias errors and scale factor fluctuations.

The output of the polarizer 30 then propagates to the optical coupler 26, which couples part of the signal into a coupler pigtail fiber 28. The optical fiber 28 is spliced to a photodetector pigtail 29, which guides the gyro output signal to a photodetector 40. The photodetector 40 converts the optical interference pattern into an electrical signal. The output of the photodetector 40 is fed into gyro output signal processing circuitry 44.

There are several possible locations in the fiber optic rotation sensor for the fiber 20 of FIG. 1 that absorbs the pump light. These locations include:
A. The gain fiber 12 itself;
B. The gain fiber pigtail 20;
C. In a distribution network if the source is used for more than one gyro;
D. As the multiplex coupler fibers 24 and 25 or 27 and 28;
E. Between the multiplex coupler 26 and the polarizer 30;
F. Between the polarizer 30 and the coupler 32;
G. As part of the gyro sensing coil fibers 34, 35 or 36;
H. Between the multiplex coupler 26 and the detector pigtail 28;
I. As the detector pigtail 29.

Figure 5:
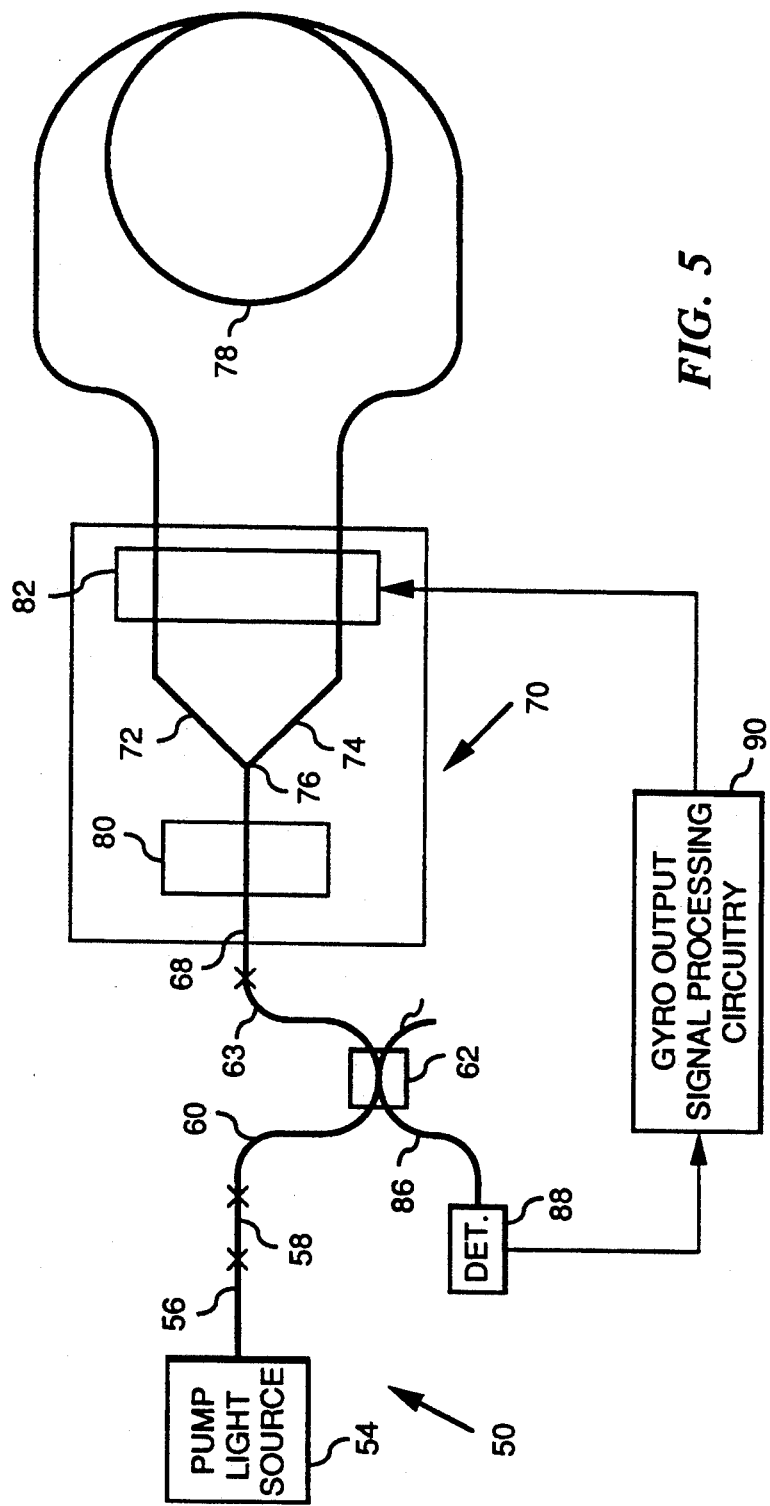

FIG. 5 illustrates a second optical fiber rotation sensor 50 that incorporates the present invention. A pump light source 54 provides pump light to a gain fiber 56. An optical fiber 58 is spliced to the gain fiber 56 to absorb the pump light as described previously. A coupler pigtail fiber 60 is spliced to the absorbing fiber 58 to guide the light optical signal to a multiplexer coupler 62. The output of the multiplexer coupler 62 is input to a waveguide 68 formed on a multifunction integrated optic chip 70. A pair of waveguides 72 and 74 are also formed on the chip 70. The waveguide 68 guides the input signal to a junction 76 where the light divides between the two waveguides 72 and 74. ends connected to the waveguides 72 and 74. As viewed in FIG. 5, the optical output of the waveguide 72 forms the clockwise wave in the sensing coil, and the output of the waveguide 74 forms the counterclockwise wave.

A polarizer 80 is formed on the chip 70 to polarize light guided by the waveguide 68. A phase modulator 82 is formed on the chip 70 to provide means for modulating the phase of waves guided by the waveguides 72 and 74.

The counterclockwise and clockwise waves traverse the sensing coil 78 and enter the waveguides 72 and 74. The waves then combine at the junction 76 and propagate through the waveguide 68. The combination of the waves is the optical output of the rotation sensor 50. The waveguide 68 then guides the combined waves to the fiber 63, which then guides them to the multiplexer coupler 62. The multiplexer coupler 62 directs part of the sensor output to a fiber 86, which guides the optical output to a detector 88. A feedback electronics circuit 90 connected between the detector 88 and the phase modulator 82 determines the rotation rate.

As in the rotation sensor 10 of FIG. 1, the absorbing fiber 58 may be located in any one of several locations. All that is necessary is that the pump light be absorbed before it reaches the detector 88. Therefore, the absorbing fiber 58 may be located anywhere in the optical fiber light path between the pump light source 54 and the detector 88.

In addition to serving as the light source in a fiber optic rotation sensor, a light source formed to include the absorber according to the present invention may be used in optical communications systems. Such light sources may be used to amplify optical signals and make it possible to avoid the use of conventional repeaters.

The structures and methods disclosed herein illustrate the principles of the present invention. The invention may be embodied in other specific forms without departing from its spirit or essential characteristics. The described embodiments are to to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A passive light absorber for absorbing residual pump light output from an optically pumped optical fiber light source, comprising a length of optical fiber connected to receive the light output from the optically pumped light source and ytterbium ions doped in the optical fiber in a concentration of at least 5000 parts per million for interacting with the pump light to attenuate the pump light intensity.

2. The apparatus of claim 1 wherein the light source is pumped with a pump light source that emits a pump light wavelength of 980 nm.

3. The apparatus of claim 2 wherein the light source includes a gain fiber that is doped with erbium, which interacts with the pump light to produce an optical signal having a wavelength of about 1550 nm.

4. A method for forming a passive light absorber for absorbing residual pump light output from an optically pumped optical fiber light source, comprising the steps of connecting a length of optical fiber to the optically pumped light source to receive the light output from and doping the optical fiber with ytterbium ions in a concentration of at least 5000 parts per million for interacting with the pump light to attenuate the pump light intensity.

5. The method of claim 4 including the steps of pumping the light source with a pump light source that emits a pump light wavelength of 980 nm.

6. A method for absorbing residual pump light output from an optically pumped optical fiber light source to a fiber optic rotation sensor, comprising the steps of:
    forming a fiber optic rotation sensor that senses rotation about a sensing axis of a coil of optical fiber by means of the Sagnac effect;
    applying an optical signal to the fiber optic rotation sensor with an optically pumped light source;
    detecting optical signals output from the fiber optic rotation sensor with a detector;
    doping a length of an optical fiber with ytterbium ions in a concentration of at least 5000 parts per million: and
    connecting the length of optical fiber in the optical path between the light source and the detector to attenuate the pump light intensity.

* * * * *